(12) United States Patent
Viot

(10) Patent No.: US 6,959,616 B2
(45) Date of Patent: Nov. 1, 2005

(54) PIPETTE PROVIDED WITH SAMPLED VOLUME ADJUSTING MEANS

(75) Inventor: Francois Viot, Auvers-sur-Oise (FR)

(73) Assignee: Gilson S.A.S., Villiers le Bel (FR)

( * ) Notice: Subject to any disclaimer, the term of this patent is extended or adjusted under 35 U.S.C. 154(b) by 143 days.

(21) Appl. No.: 10/240,428

(22) PCT Filed: Apr. 9, 2001

(86) PCT No.: PCT/FR01/01068

§ 371 (c)(1), (2), (4) Date: Jun. 2, 2003

(87) PCT Pub. No.: WO01/76748

PCT Pub. Date: Oct. 18, 2001

(65) Prior Publication Data

US 2004/0035228 A1 Feb. 26, 2004

(30) Foreign Application Priority Data

Apr. 7, 2000 (FR) ........................................... 00 04473

(51) Int. Cl.[7] ................................................ G01L 1/14
(52) U.S. Cl. .................................................. 73/864.18
(58) Field of Search ......................... 73/864.18, 864.16; 422/100; 436/180

(56) References Cited

U.S. PATENT DOCUMENTS

| | | | | |
|---|---|---|---|---|
| 2,986,119 A | | 5/1961 | Roesler et al. | |
| 3,497,305 A | | 2/1970 | König | |
| 3,604,267 A | | 9/1971 | Johns | |
| 3,766,785 A | | 10/1973 | Smernoff | |
| 3,918,308 A | | 11/1975 | Reed | |
| 3,991,617 A | | 11/1976 | d'Autry | |
| 4,009,611 A | | 3/1977 | Koffer et al. | |
| 4,164,870 A | | 8/1979 | Scordato et al. | |
| 4,263,257 A | | 4/1981 | Metsälä | |
| 4,268,481 A | | 5/1981 | Suovaniemi et al. | |
| 4,369,665 A | | 1/1983 | Citrin | |
| 4,442,722 A | | 4/1984 | Meyer | |
| RE32,210 E | | 7/1986 | d'Autry | |
| 5,012,682 A | * | 5/1991 | Sabloewski | 73/864.18 |
| 5,073,343 A | | 12/1991 | Hukuhara et al. | |
| 5,320,810 A | * | 6/1994 | Al-Mahareeq et al. | 422/100 |
| 5,413,006 A | | 5/1995 | D'Autry | |
| 5,435,197 A | | 7/1995 | Telimaa et al. | |
| 5,614,153 A | | 3/1997 | Homberg | |
| 5,650,124 A | * | 7/1997 | Gilson | 422/180 |

(Continued)

FOREIGN PATENT DOCUMENTS

| | | |
|---|---|---|
| DE | 2954504 | 9/1986 |
| DE | 4339143 | 5/1995 |
| EP | 0566939 | 10/1993 |
| EP | 0704242 | 4/1996 |
| EP | 1268070 | 11/2003 |
| EP | 1268067 | 6/2004 |
| EP | 1268068 | 8/2004 |
| FR | 1166673 | 11/1958 |
| FR | 00 04475 | 12/2002 |
| FR | 0004472 | 4/2004 |
| GB | 2029723 | 3/1980 |
| WO | WO 93/11870 | 6/1993 |
| WO | WO 96/04991 | 2/1996 |
| WO | WO 01/42759 | 6/2001 |
| WO | WO 01/76747 | 10/2001 |
| WO | WO 01/76749 | 10/2001 |
| WO | WO 01/76750 | 10/2001 |
| WO | WO 01/76751 | 10/2001 |
| WO | WO 01/76752 | 10/2001 |
| WO | WO 01/76753 | 10/2001 |

*Primary Examiner*—Robert Raevis
(74) *Attorney, Agent, or Firm*—Foley & Lardner LLP

(57) ABSTRACT

The sampling pipette includes means for adjusting the volume of liquid to be taken. It includes a locking element that is movable between an inactive position in which it makes the adjustment means unsuitable for performing adjustment and an active position in which it makes the adjustment means suitable for performing adjustment.

16 Claims, 8 Drawing Sheets

U.S. PATENT DOCUMENTS

| | | | | |
|---|---|---|---|---|
| 5,696,330 | A | 12/1997 | Heinonen | |
| 5,792,424 | A | 8/1998 | Homberg et al. | |
| 5,849,248 | A | * 12/1998 | Homberg | 422/100 |
| 5,879,633 | A | 3/1999 | Tervamaki et al. | |
| 5,958,343 | A | 9/1999 | Astle | |
| 5,983,733 | A | 11/1999 | Strandberg et al. | |
| 6,295,880 | B1 | 10/2001 | Gilson | |
| 6,532,877 | B1 | 3/2003 | Hepburn et al. | |
| 6,779,412 | B2 | 8/2004 | Viot | |
| 2003/0074988 | A1 | 4/2003 | Suovaniemi et al. | |
| 2003/0074989 | A1 | 4/2003 | Magnussen et al. | |
| 2003/0159525 | A1 | 8/2003 | Viot | |

* cited by examiner

PIPETTE PROVIDED WITH SAMPLED VOLUME ADJUSTING MEANS

The invention relates to pipettes for sampling liquids.

Document FR-2 696 110, for example, discloses a sampling pipette having a knurled wheel accessible through a window in the body of the pipette in order to adjust the volume of liquid to be taken. The volume is also indicated on a display. That pipette presents numerous advantages. The knurled wheel does not project outside the body of the pipette and is therefore relatively unlikely to be actuated involuntary. In addition, while it is being driven, the knurled wheel is braked by means of a friction assembly which further reduces any risk of losing adjustment. Nevertheless, it is desirable to improve it further. There remains a small risk of the volume to be taken being accidentally altered by involuntary action on the knurled wheel.

It is therefore desired to eliminate any risk of accidental alternation to the volume that is to be taken.

Document U.S. Pat. No. 5,849,248 discloses a pipette having a locking element that is movable between an inactive position in which it prevents the adjustment means from performing adjustment, and an active position in which it allows them to perform adjustment. That element extends close to a volume-adjusting knob. There is therefore no need to fear any unwanted change to the volume to be taken.

An object of the invention is to provide a pipette of a type that is different but that also avoids unwanted change of adjustment.

According to the invention, this object is achieved by providing a sampling pipette including means for adjusting the volume of liquid taken as a sample, said means comprising at least one adjustment control member, the pipette including a locking element movable between an inactive position in which it makes the adjustment means unsuitable for performing adjustment and an active position in which it makes the adjustment means suitable for performing adjustment, the locking member being the adjustment control member.

Thus, when the locking element is in the inactive position, it is not possible accidentally to change the adjustment of the volume to be taken. In addition, this elimination of any risk of loss of adjustment makes it possible in return to eliminate or reduce the friction braking on the knurled wheel, thereby making it easier to turn when making an adjustment voluntarily. This elimination is all the more welcome since with the prior art pipette of document FR-2 696 110, it is possible for the user's glove to become pinched between the wheel and the body of the pipette while turning the wheel. This drawback can thus likewise be eliminated.

Furthermore, the pipette of the invention enables a single locking element to be used for all of the successive operations associated with adjustment, e.g. unlocking, volume adjustment, and locking.

The invention may also present at least any one of the following characteristics:

- the locking element is slidably movable between the two positions;
- the locking element is arranged to be driven directly from one of the two positions to the other by a user;
- the locking element extends inside a body of the pipette;
- the pipette is arranged in such a manner that the locking element is suitable for transmitting an adjustment movement to a member of the adjustment means when in the active position, and is unsuitable for performing such transmission when in the inactive position;
- the pipette is arranged in such a manner that the locking element is suitable for transmitting movement from one to the other of two members of the adjustment means other than the locking element when in the active position, and is unsuitable for performing said transmission when in the inactive position;
- the movement is a turning movement;
- the adjustment means comprise two members arranged to be positively engaged with each other when the locking element is in the active position, and to be disengaged from each other when the locking element is in the inactive position;
- the pipette has two adjustment control members;
- the pipette includes a sampling control knob forming an adjustment control member;
- the pipette includes return means for returning the locking element into the inactive position;
- the pipette has means for holding the locking element in the inactive position against the return means;
- the pipette is arranged in such a manner that the locking element is suitable for passing from the active position to the inactive position by passing through a hard point; and
- the adjustment means comprise a driving member and a driven member suitable for being driven by the driving member via at least one complementary shape connection, one of the driving and driven members being deformable so as to interrupt the connection when it is subjected to intense urging exceeding a predetermined intensity.

Other characteristics and advantages of the invention appear further from the following description of a preferred embodiment and of a variant given as non-limiting examples. In the accompanying drawings.

Figure 1:
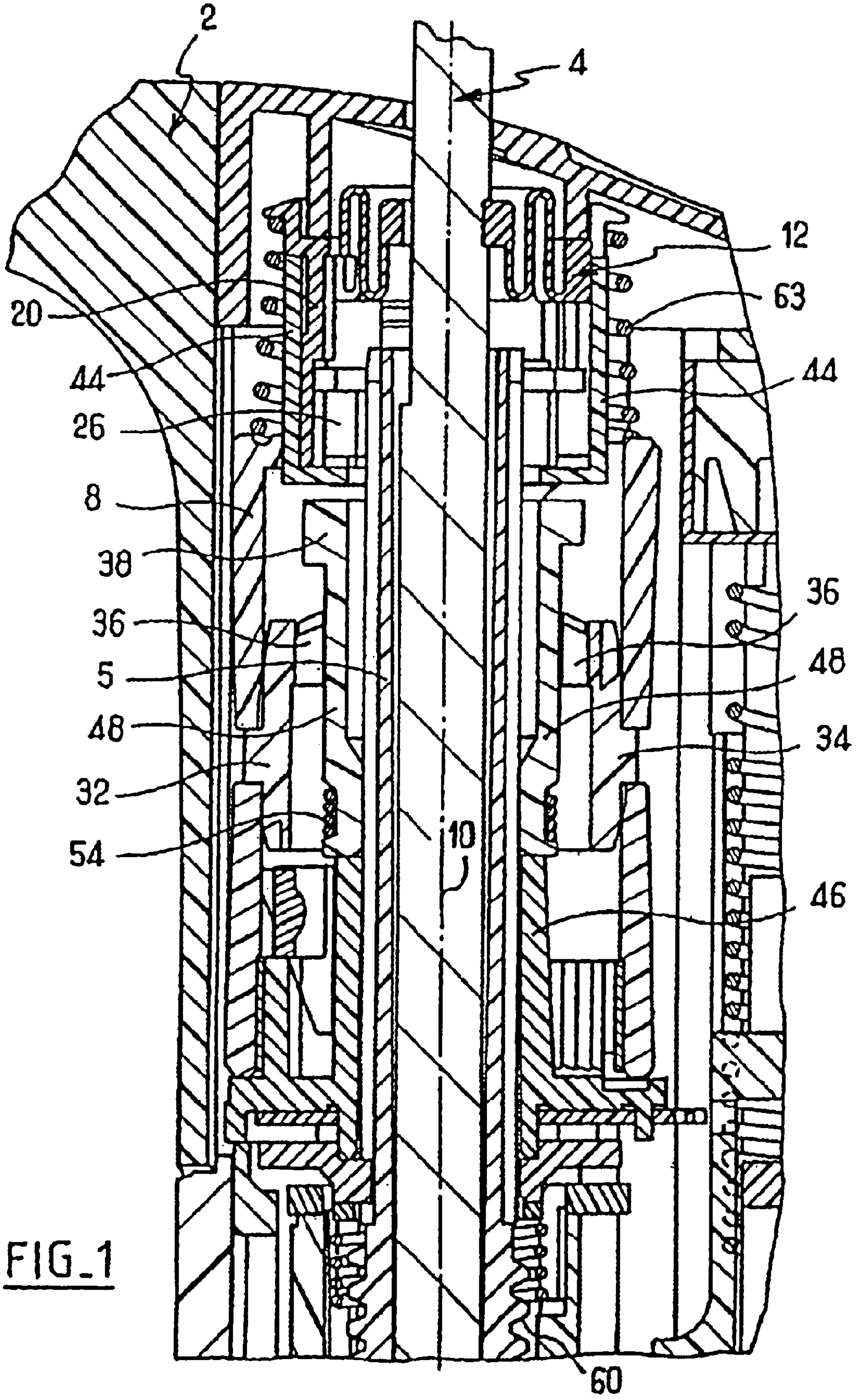
FIG. 1 is a fragmentary axial section view of a pipette constituting a preferred embodiment of the invention.
Figure 2:
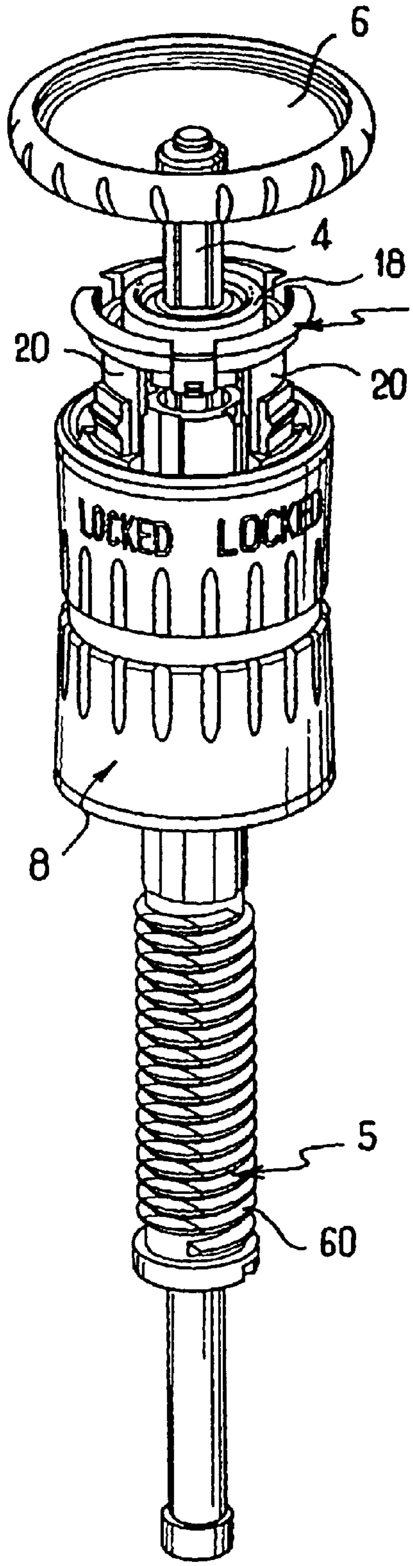
FIG. 2 is a perspective view of a portion of the adjustment mechanism of the FIG. 1 pipette.

The sampling pipette of the present embodiment of the invention is of the same type as that of document FR-2 696 110. Reference should therefore be made to that document for certain details of the pipette already disclosed therein. Only certain aspects of the volume-adjusting mechanism are described in detail herein.

In conventional manner, the pipette 2 comprises a body 2 serving as a handle to be held in the hand of the user. The pipette has a piston (not shown) slidably movable along a longitudinal axis 10 of the pipette inside a bottom cavity of the pipette in order to suck a volume of liquid to be taken into said cavity or in order to expel the liquid therefrom. Piston displacement is controlled in particular by means of a control rod 4 of axis 10 having its bottom portion connected to the piston via parts of conventional type and not shown. At its top end, the rod 4 is surmounted by a pushbutton 6 rigidly fixed to the rod suitable for being actuated by the user using the thumb of the hand that is holding the pipette. This causes the piston to move down or up as a function of the corresponding movement of the knob. The pipette includes a return spring suitable for returning the piston and the rod to the high position at the end of their down stroke for expelling liquid, and a purge spring whose effect is added to that of the return spring when the stroke of the piston is continued downwards for a purge stroke.

The volume to be taken during a normal full stroke of the piston, not including any purge stroke, can be adjusted by means of an adjustment knob 8 in the form of a ring, and by means of the pushbutton 6. These two knobs are mounted so as to be capable of turning about the longitudinal axis 10 of the pipette. Turning either of these knobs causes and adjustment screw 5 that is coaxial with the rod 4 to turn about the axis 10. The way in which turning the adjustment screw 5 causes the volume to be taken to vary is conventional and is not described. There follows a detailed description of the top portion of the adjustment mechanism.

All of the parts described below are symmetrical about the axis 10 unless otherwise specified.

With reference to FIGS. 1 to 4, the pipette has a coupler 12 slidably mounted on the rod 4 but constrained to turn together therewith. For this purpose, the coupler presents a central top orifice presenting three radial tabs 14 engaging in three longitudinal grooves 16 in the rod 4. This orifice is formed by a top washer 18 of the coupler. The coupler has three arms 20 extending downwards parallel to the axis 10 away from the washer 18. Each arm 20 is generally flat in the direction extending radially to the axis 10, and on its face 22 facing away from the axis it presents an elongate portion in relief 24 extending in the circumferential direction of the axis 10.

The adjustment knob 8 is slidably movable along the axis 10 and can be turned about said axis. It is essentially cylindrical in shape about the axis 10. The outside face 26 of this adjustment knob is accessible to the user via windows in the body to enable the adjustment knob to be manipulated. For this purpose, the adjustment knob has portions in relief for gripping purposes. Close to its top circular edge, the adjustment knob 8 has three forks 30 projecting radially towards the axis. These forks are in the form of female U-shapes open towards the axis, and they are complementary in shape to the profiles of the arms 20, receiving respective ones of them.

It follows from the above arrangement that the adjustment knob 8 is constrained to turn with the coupler 12 but that it is not fixed thereto in sliding. The adjustment knob 8 can occupy both a low or inactive position constituting a locked position, and a high or active position constituting an unlocked position. These two positions are independent of the angular position of the adjustment knob 8 about the axis. The adjustment knob moves from one position to the other by sliding along the axis. The coupler 12 has an annular spring 25 about the axis 10 pressing radially against the inside faces of the arms 20 to urge them radially away from the axis.

Figure 11:
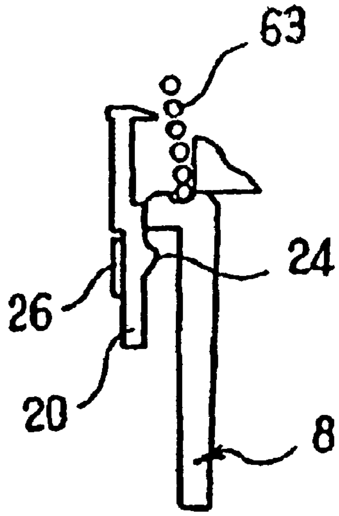

In the low position, as shown in FIGS. 1 to 4, and 8, the arms 20, but not the portions 24 in relief, are received in the forks. The same applies in the high position as shown in FIG. 11. On passing from one position to the other, as shown in FIGS. 8 to 11, the portions in relief 24 are received in the forks and cause the arms 20 to flex temporarily in a radial direction. This leads to an audible click and provides a hard point during manipulation, thus informing the user about changes between the high and low positions. In addition, the portions 24 in relief hold the knob in the high position against the return spring, unless contrary action is exerted by the user.

Figure 4:
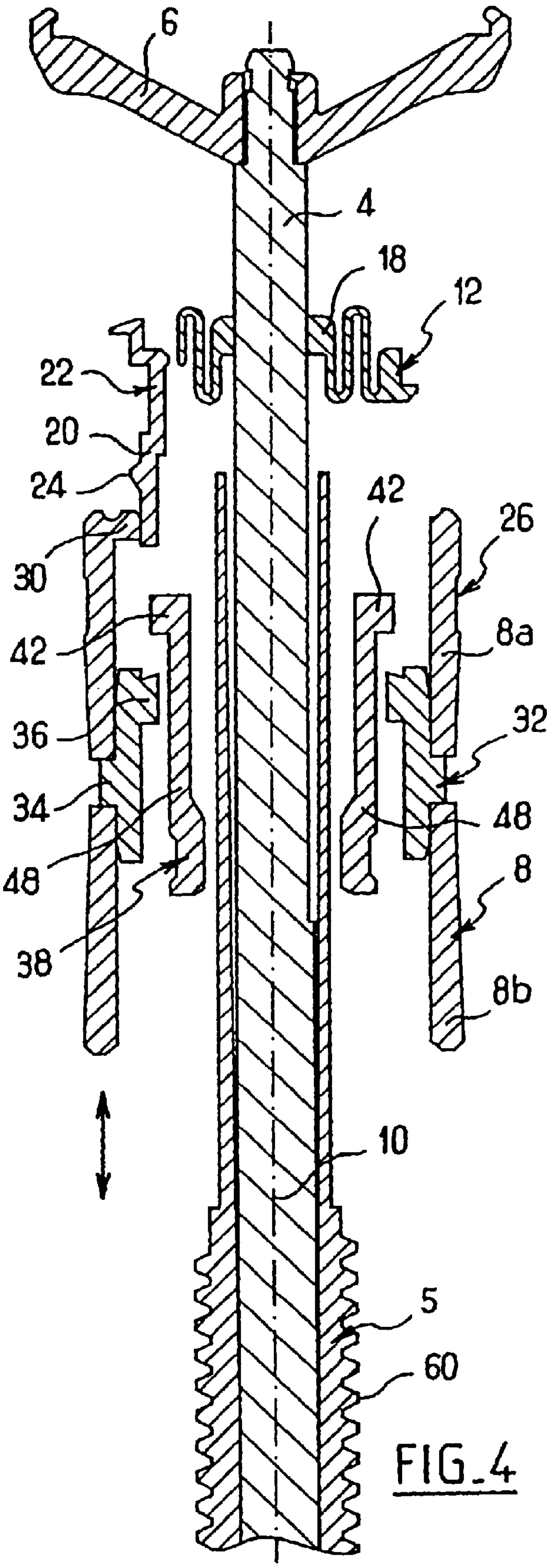
FIG. 4 is an axial section view of the FIG. 2 mechanism.
Figure 7:
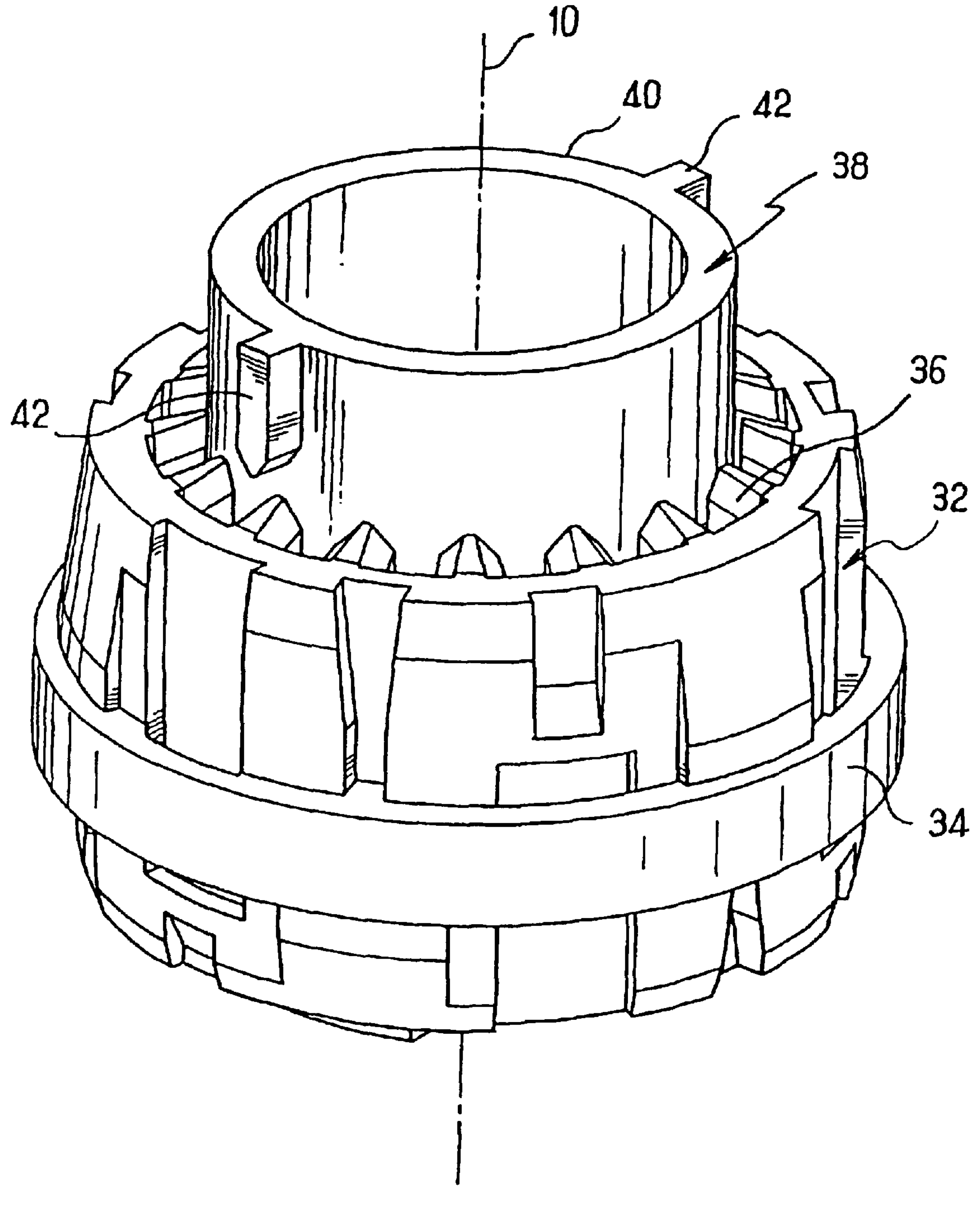
FIG. 7 is a perspective view of the positive clutch and the driver of the FIG. 4 mechanism.
Figure 8:
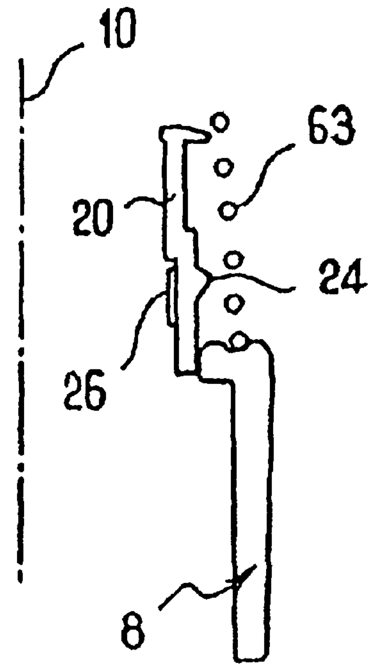
FIGS. 8 to 11 are four fragmentary views in axial section showing the various stages of co-operation between the adjustment knob and the coupler of the FIG. 4 mechanism.
Figure 9:
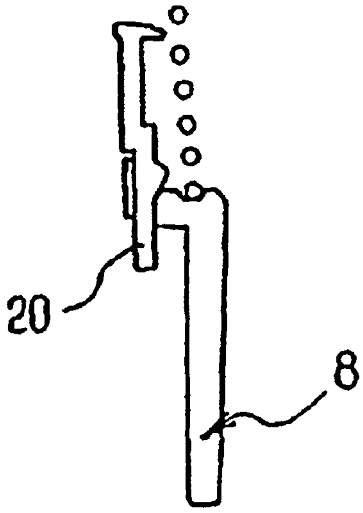
Figure 10:
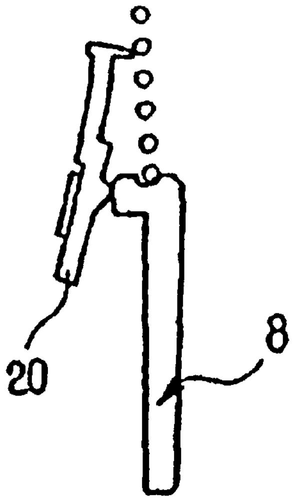

With reference to FIGS. 1, 4, and 7, the pipette has a positive clutch 32 of generally cylindrical shape presenting an outer annular peripheral rib 34 approximately at half-height. The adjustment knob 8 comprises two cylindrical parts 8*a* and 8*b* constituting a top part and a bottom part that are engaged as force-fits on the outside of the clutch 32 and that bear axially against the rib 34. The adjustment knob 8 is rigidly secured to the clutch. On its outside face, as shown in detail in FIG. 7, the clutch has portions in relief that co-operate with complementary portions in relief on the adjustment knob in order to provide said rigid connections. The clutch 32 has a set of teeth 36 extending close to its top edge, projecting radially from its inside face towards the axis.

The pipette has a driver 38 with a top portion 40 of cylindrical shape provided with a plurality of teeth 42, e.g. two teeth, extending close to its top edge, projecting from its outside face radially away from the axis. These two teeth are suitable for engaging with the set of teeth 36 in the clutch when they are at the same height along the axis 10 as the set of teeth.

The driver 38 can be moved relative to the adjustment screw 5. It extends directly in register therewith in a radial direction. Unlike the adjustment screw 5 which is free to turn helically about the axis 10, the driver 38 is prevented from sliding along the axis 10 relative to the body of the pipette. For this purpose, its top portion is blocked by a spacer 44 and its bottom portion is blocked by a part 46, as shown in FIG. 1.

Figure 5:
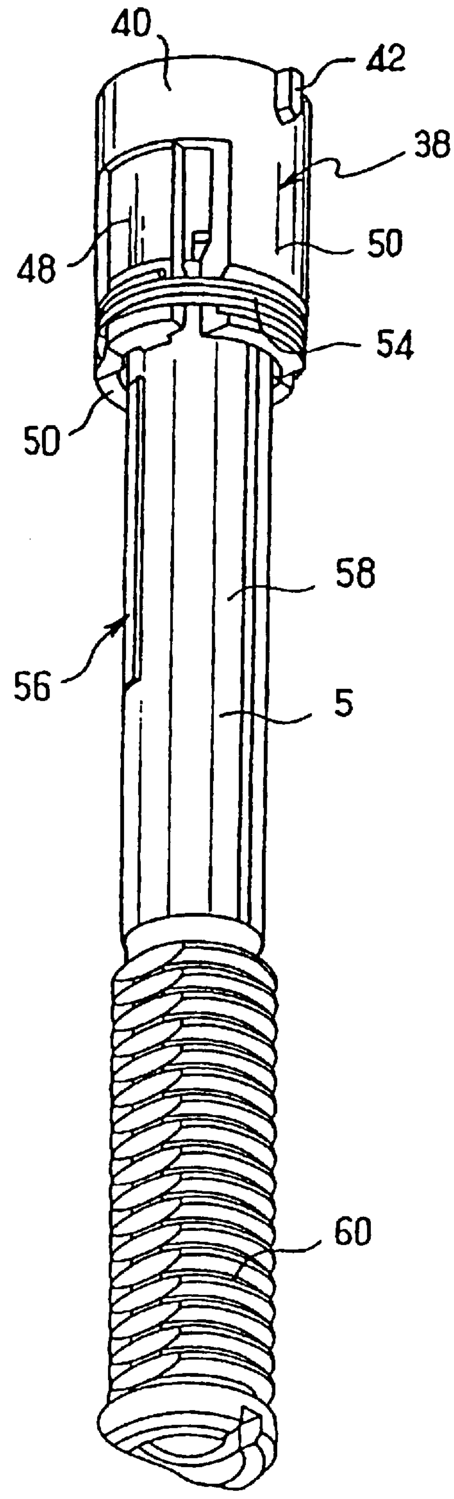
FIG. 5 is a perspective view of a sub-portion of the FIG. 2 mechanism.
Figure 6:
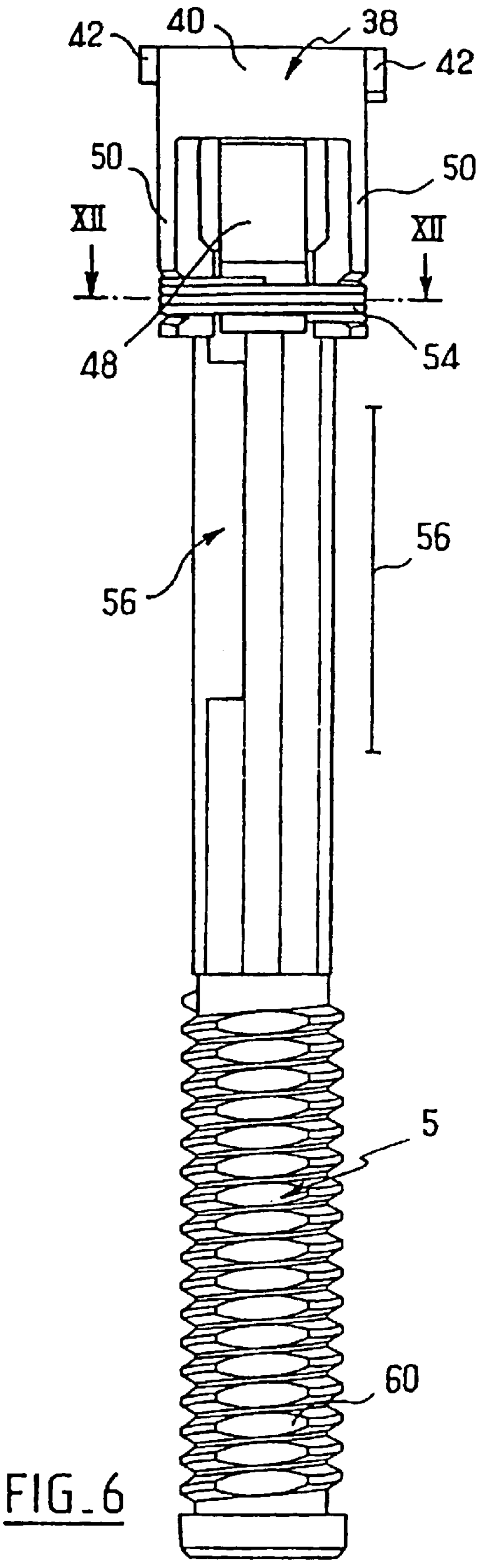
FIG. 6 is an elevation view of the FIG. 5 sub-portion.
Figure 12:
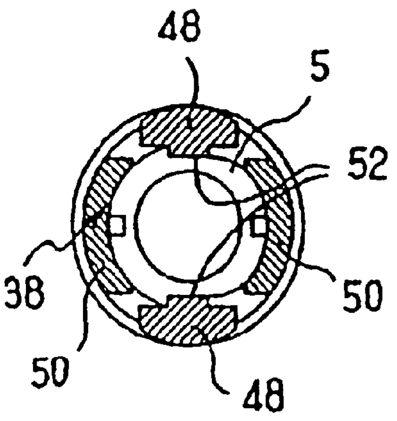
FIG. 12 is a cross-section view of the FIG. 6 sub-portion on plane XII—XII.
Figure 13:
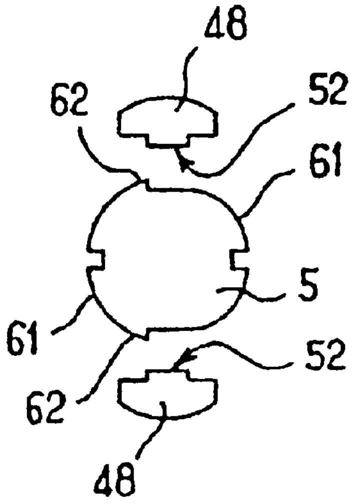
FIG. 13 is an exploded section of certain elements of FIG. 12.
Figure 14:
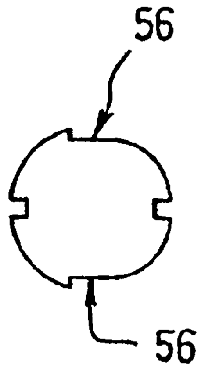
FIG. 14 is a section view of the adjustment screw on its own.

With reference in particular to FIGS. 5, 6, and 12, the driver 38 has two main tabs 48 and two secondary tabs 50 extending parallel to the axis 10 downwards from the top portion 40. The secondary tabs 50 are in the form of cylindrical sectors about the axis 10. They alternate around the axis with the main tabs 48. The main tabs 48 have cylindrical outside faces and inside faces that are plane, from which there project respective splines 52 of rectangular section extending parallel to the axis 10. The driver 38 has a spring 54 surrounding the outside of the four tabs 48, 50 and received in outside notches thereof. The spring tends to urge the tabs radially towards the axis.

The adjustment screw 5 is hollow and has the control rod 4 passing longitudinally therethrough. These two parts are completely independent concerning relative movement. The adjustment screw 5 is generally circularly symmetrical. Nevertheless, and more precisely, the adjustment has two flats 56 that are parallel to each other and to the axis 10 on opposite sides of said axis. These flats extend over a middle portion 58 of the adjustment screw extending above a bottom portion 60 of the adjustment screw that is threaded and serves to adjust volume. The flats 56 are connected to each other via circular arcs 61. The adjustment screw also has two longitudinally extending ridges 62 parallel to the axis 10, extending from the edges of respective flats so as to constitute abutments when going circumferentially around the outside face of the adjustment screw 5 away from the flats, and also so as to present circular arcs that do not form abutments going away from the cylindrical zones 61.

The two ridges 62 are not symmetrical to each other about the axis 10, but they are symmetrical to each other about a midplane of the screw parallel to the two flats. In addition, the two ridges 62 do not coincide exactly with each other in position along the axis 10. They overlap over a certain length. However, one of the ridges extends higher than the other whereas said other ridge extends further down than the first. The two ridges thus overlap in part along the axis 10. The longitudinal position of the second ridge, normally hidden in FIG. 6, is nevertheless represented by a line 56.

The driver 38 may be coupled to turn with the adjustment screw 5, or it may be decoupled therefrom.

Figure 15:
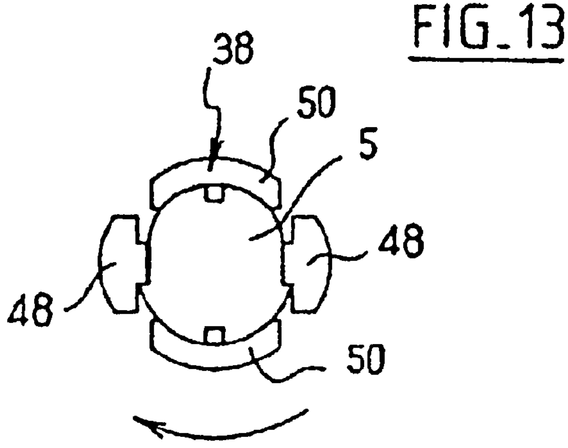
FIGS. 15 to 18 show various stages of co-operation between the elements of FIG. 12.
Figure 16:
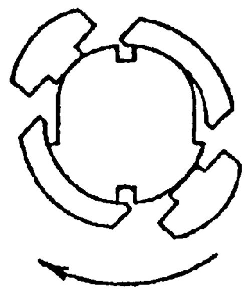
Figure 17:
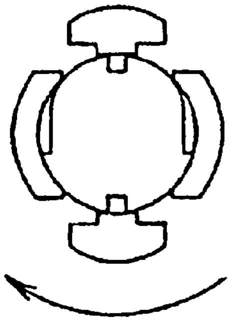
Figure 18:
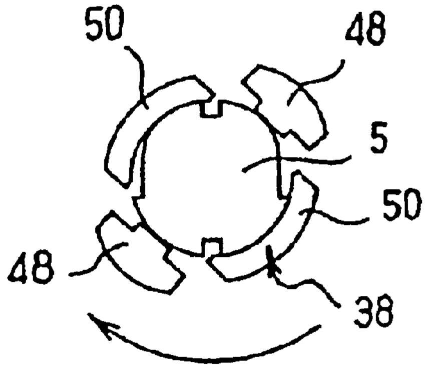

When coupled, as shown in FIGS. 12 and 15, the driver is situated at a level along the adjustment screw where the two ridges 62 overlap. The secondary tabs 50 press against the cylindrical zones 61 and are complementary in shape thereto. They co-operate therewith to form surface-on-surface contact. The splines 52 bear radially against the flats 56 and come into abutment against the respective ridges 62. The spring 54 holds the four tabs pressed against the adjustment screw 5, and in particular it keeps the splines engaged against the ridges. Consequently, any turning movement of the driver 38 can be transmitted to the adjustment screw 5. Since the driver, unlike the adjustment screw 5, is prevented from sliding along the axis, such turning causes the adjustment screw to slide along the axis, with the adjustment screw moving helically. These two parts are thus coupled to turn about the axis by means of friction forces, and above all by means of the ridges and the splines. Torque is thus transmitted even against a high level of opposing torque.

The ridges 62 are positioned in such a manner that in the vicinity of each top and bottom end-of-stroke positions of the adjustment screw 5, the ridge which serves to transmit movement towards said abutment is interrupted, as shown in FIGS. 14 to 18. As a result, over the entire remaining stroke to be traveled before reaching the abutment position, torque transmission takes place only via friction forces between the tabs and the adjustment screw. Under such conditions, transmission takes place only if the magnitude of the connection forces, and thus the magnitude of the opposing torque, is less than a predetermined value which is a function of the spring 54. This transmission nevertheless takes place so that the user can continue to manipulate the driver 38 (indirectly as described below) in order to drive the adjustment screw 5. Once the adjustment screw 5 reaches the end of the adjustment stroke, the opposing torque becomes infinitely large and breaks the connection via the friction forces. In spite of the return effect of the spring 54, the main tabs 48 then splay apart so as to move off the flats and onto the zones 61 in order to follow the shape of the adjustment screw, thus allowing the driver 38 to turn on its own. The adjustment screw 5 is thus subjected to little force and remains stationary. The bottom portion 60 of the adjustment screw 5 is thus protected against excessive force.

If the user seeks to drive the adjustment screw 5 in the opposite direction away from this position, it suffices to turn the driver 38 in the opposite direction. Within less than half a turn, one of the splines 52 meets the other ridge 62 and the two parts are again connected to turn together, but in the opposite direction. The same operation occurs in the vicinity of the other end of the adjustment stroke.

The operation of the adjustment knob 8 is described below.

Figure 3:
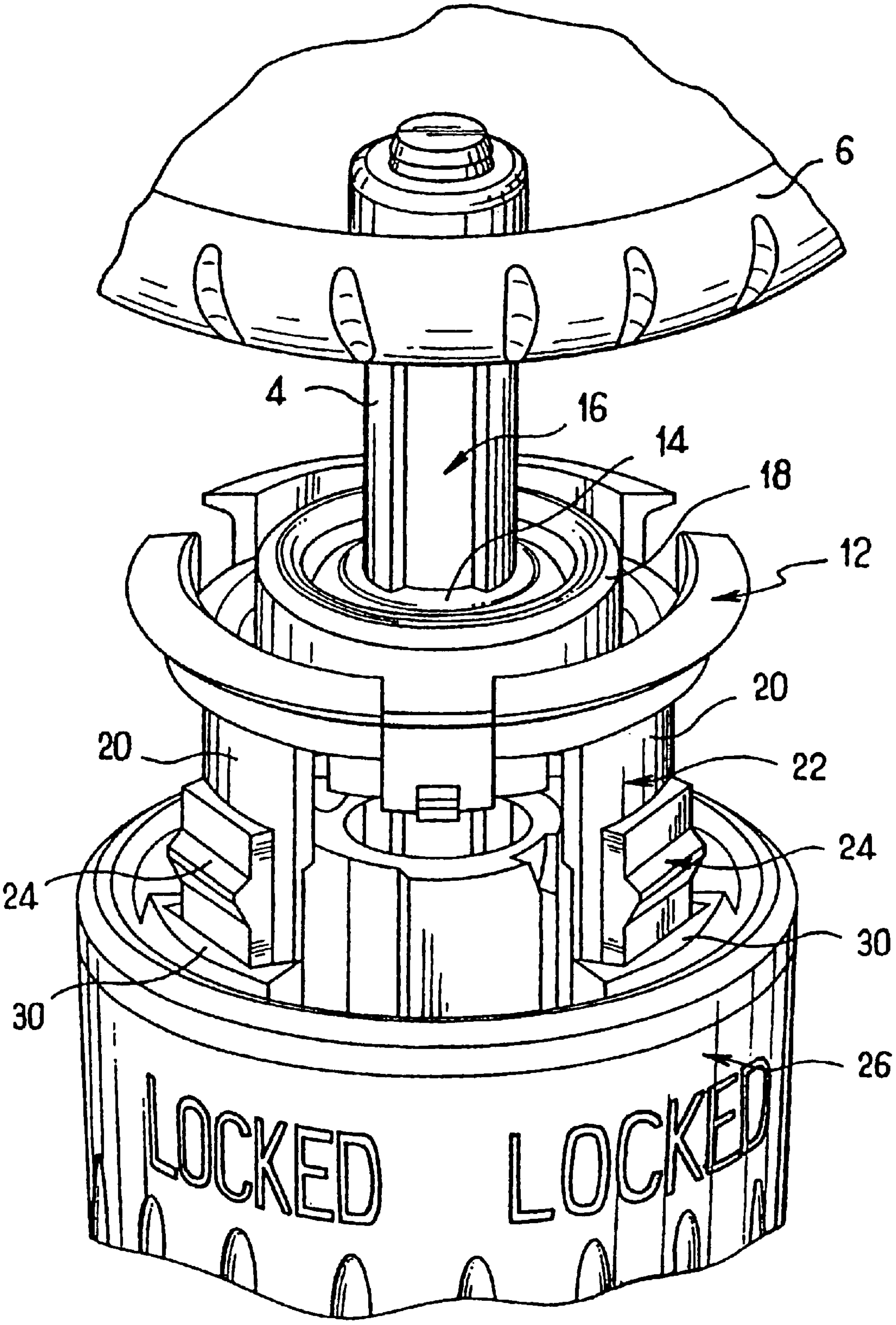
FIG. 3 is a larger scale view of the FIG. 2 mechanism.

The knob is shown in its low, inactive, and locked position in FIGS. 1, 3, and 4. The arms 20 are in engagement with the adjustment knob 8. In this position, the teeth 36 of the clutch are out of engagement with the teeth 42 of the driver 38. Any movement of the adjustment knob 8 is thus prevented from turning the driver 38 or the adjustment screw 5. This low position of the adjustment knob 8 thus causes the adjustment means to be inactive. The volume to be taken therefore cannot be modified either voluntarily or involuntarily. The word "locked" written on the outside face 26 of the adjustment knob 8 appears in the window where it can be seen by the user. A return spring 63 shown in FIG. 1 bears axially upwards against the coupler 12 and downwards against the adjustment knob 8, thereby urging the adjustment knob so as to keep it in this low position.

If the user desires to adjust the volume, then the adjustment knob 8 must be slid upwards against the return spring 63 so that the forks 30 go past the portions 24 in relief, thereby producing a click and a hard point. The adjustment knob is then in its high, active, and unlocked position. It is held in this position by the portions 24 in relief until the user applies an opposing force. While in this position, the teeth 36 of the clutch are engaged with the teeth 42 of the driver 38. Any turning action applied by the user directly to the adjustment knob 8 or to the pushbutton 6 is thus transmitted via the teeth 36, 42 to the driver 38, and then to the adjustment screw 5, providing it is not already at the end of its stroke in the desired adjustment direction. Once the desired sampling volume has been set, the user can slide the adjustment knob 8 back into its low position to prevent any untimely loss of adjustment.

In the above-described pipette, it should be observed that the driver 38 is clamped against the adjustment screw 5, i.e. these parts are thus clutched or declutched in a manner that is automatic and not due to direct action taken by the user on these parts. In addition, the user never acts directly on the adjustment screw 5.

Provision can be made for that one of the adjustment screw 5 and driver 38 which is deformable in order to interrupt the connection between them to be the adjustment screw 5.

Figure 19:
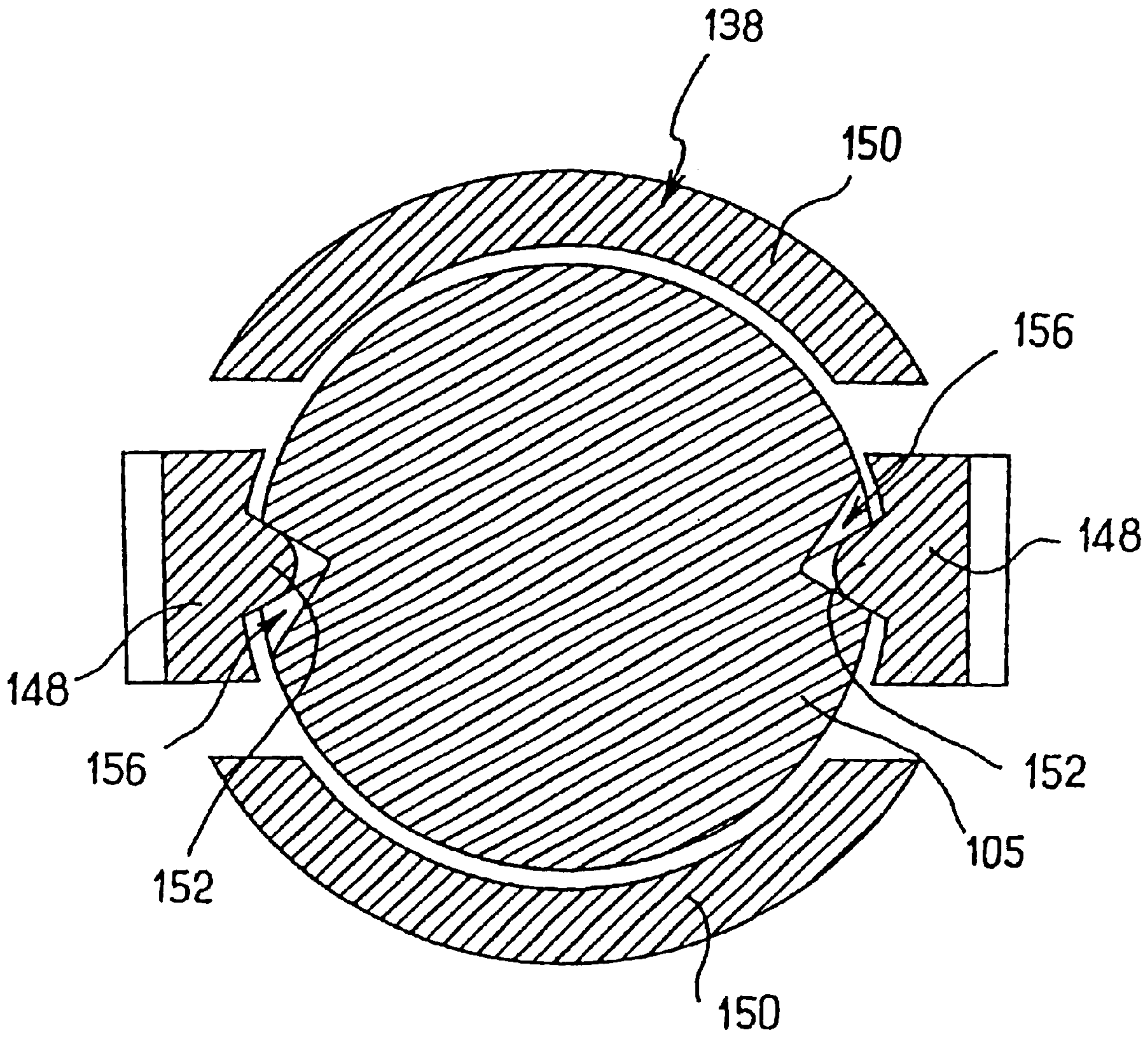
FIG. 19 is a view analogous to FIG. 12 showing a variant embodiment of the invention.

FIG. 19 shows a variant embodiment in which numerical references plus 100 are given to elements that are analogous. The rod 104 is not shown.

In this variant, the splines 152 have a profile which is V-shaped with a rounded tip. The flats 156 are replaced by V-grooves 156 having the same V-angle as the splines so as to enable the screw 105 to be driven by the driver 138. In the vicinity of the abutment positions, the respective grooves flare so as to increase the slope of one of their two faces. This face forms a ramp. The pipette is arranged in such a manner that once the end-of-stroke position is reached, the clamping force of the spring is insufficient to hold the splines 152 in the grooves 156. The ramp then causes the splines to escape from the grooves and the main tabs 148 to be splayed apart such that the driver no longer drives the screw and continues to turn on its own.

The pipette may include electronic display means (e.g. liquid crystal means) for displaying a parameter relating to the operation of the pipette. For example, these means may continuously indicate the locked or unlocked state of the knob 8.

What is claimed is:

1. An adjustable volume sampling pipette comprising:

(a) a pipette body having a longitudinal axis;

(b) an adjustment screw disposed inside the pipette body, the adjustment screw capable of turning to adjust a volume in the pipette; and (c) an adjustment knob, wherein the adjustment knob is accessible to a user via a window in the pipette body, and further wherein the adjustment knob is movable between an active position in which a turning action applied to the knob is transmitted to the adjustment screw and an inactive position in which a turning action applied to the adjustment knob is prevented from turning the adjustment screw.

2. The pipette of claim 1 wherein the adjustment knob is slidably movable between the active position and the inactive position in a direction parallel to the longitudinal axis of the pipette.

3. The pipette of claim 1, further comprising a rod coupled to the adjustment knob and passing longitudinally through the adjustment screw.

4. The pipette of claim 3, further comprising a pushbutton mounted to the top end of the rod.

5. The pipette of claim 3, wherein the rod is coupled to the adjustment knob by a coupler that is slidably movable along the rod and constrained to turn with the rod.

6. The pipette of claim 5, wherein the coupler comprises a washer having a central orifice and at least one tab extending radially into the orifice and the rod comprises at least one longitudinal groove along its length and further wherein the rod extends through the orifice such that the at least one tab engages the at least one groove.

7. The pipette of claim 6 wherein the washer further comprises at least one arm extending downwards away from the washer and the adjustment knob further comprises at least one fork projecting radially toward the longitudinal axis and further wherein the at least one fork receives the at least one arm.

8. The pipette of claim 7 wherein the at least one arm further comprises an elongate portion in relief extending away from the longitudinal axis and further wherein the portion in relief is received by the at least one fork when the adjustment knob passes from the active position to the inactive position to produce an audible click.

9. The pipette of claim 7 wherein the coupler further comprises an annular spring pressing against the at least one arm to urge the at least one arm away from the longitudinal axis.

10. The pipette of claim 5 wherein the adjustment knob is constrained to turn with the coupler but is not constrained to slide with the coupler.

11. The pipette of claim 1, further comprising:

(d) a clutch having a generally cylindrical shape onto which the adjustment knob is mounted, the clutch comprising an outside face, an inside face and teeth projecting radially from its inside face toward the longitudinal axis; and (e) a driver, having a cylindrical shape, disposed around a portion of the adjustment screw and extending into the clutch, the driver comprising a top portion with an outside face and teeth extending radially from the outside face away from the longitudinal axis;

wherein the teeth on the driver are positioned to engage the teeth on the clutch when the adjustment knob is in the active positioned but not when the adjustment knob is in the inactive position.

12. The pipette of claim 11, wherein the driver further comprises tabs extending downwards from the top portion, the tabs comprising inside faces and splines projecting from the inside faces and the adjustment screw comprises a middle portion above a threaded bottom portion, the middle portion having an outside face and longitudinally extending ridges along the outside face and further wherein a turning movement of the driver causes the splines to come into abutment with the ridges to transmit the turning motion to the adjustment screw.

13. The pipette of claim 12, further comprising a spring surrounding the outside of the tabs.

14. The pipette of claim 12 wherein the splines and the ridges comprise a complementary shape connection.

15. The pipette of claim 14 wherein the complementary shape connection is interrupted in a vicinity of a top end-of-stroke position of the adjustment screw or a bottom end-of-stroke position of the adjustment screw.

16. The pipette of claim 11, wherein the driver further comprises tabs extending downwards from the top portion, the tabs comprising inside faces and splines projecting from the inside faces and the adjustment screw comprises a middle portion above a threaded bottom portion, the middle portion having an outside face and grooves along the outside face and further wherein a turning movement of the driver causes the splines to come into abutment with the grooves to transmit the turning motion to the adjustment screw.

* * * * *